United States Patent
Shipp

(10) Patent No.: US 7,664,754 B2
(45) Date of Patent: Feb. 16, 2010

(54) METHOD OF, AND SYSTEM FOR, HEURISTICALLY DETECTING VIRUSES IN EXECUTABLE CODE

(75) Inventor: Alexander Shipp, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 18 days.

(21) Appl. No.: 10/500,954

(22) PCT Filed: Mar. 8, 2004

(86) PCT No.: PCT/GB2004/000997

§ 371 (c)(1),
(2), (4) Date: Sep. 3, 2004

(87) PCT Pub. No.: WO2004/097604

PCT Pub. Date: Nov. 11, 2004

(65) Prior Publication Data

US 2005/0027686 A1 Feb. 3, 2005

(30) Foreign Application Priority Data

Apr. 25, 2003 (GB) ................................ 0309464.6

(51) Int. Cl.
*G06F 17/30* (2006.01)
(52) U.S. Cl. .......................................... 707/10; 726/24
(58) Field of Classification Search .................. 707/1, 707/6, 10, 101, 3; 726/24
See application file for complete search history.

(56) References Cited

U.S. PATENT DOCUMENTS

| 5,617,533 | A  | * | 4/1997  | Wu et al. ....................... 714/38 |
| 7,107,618 | B1 | * | 9/2006  | Gordon et al. ................. 726/24 |
| 7,263,561 | B1 | * | 8/2007  | Green et al. ................... 709/246 |
| 7,310,818 | B1 | * | 12/2007 | Parish et al. ................... 726/24 |
| 2003/0023875 | A1 | * | 1/2003 | Hursey et al. ................. 713/201 |
| 2003/0070088 | A1 | * | 4/2003 | Gryaznov ..................... 713/201 |

(Continued)

FOREIGN PATENT DOCUMENTS

EP         0813132        12/1997

(Continued)

OTHER PUBLICATIONS

Skoudis, Ed, and Zeltser, Lenny. Malware: Fighting malicious Code. Prentice Hall. 2003. Chapter 2.*

(Continued)

*Primary Examiner*—Shahid A Alam
*Assistant Examiner*—Alexandria Y Bromell
(74) *Attorney, Agent, or Firm*—Gunnison, McKay & Hodgson, L.L.P.; Philip J. McKay

(57) ABSTRACT

In an anti-virus scanning system for computer files being transferred between computers, the number of files requiring detailed scanning is first reduced by identifying files which are instances of programs which are known and deemed to be safe. This is done by reference to a database of known executables which records characteristics which can be used as the basis for identifying a file as an unchanged instance of a known executable. Secondly, these characteristics can then also be used to identify files which are changed instances of known executables. These are extremely suspicious, since the most likely cause of change is infection by a file infecting virus, so these files are classed as likely to be malware.

11 Claims, 1 Drawing Sheet

U.S. PATENT DOCUMENTS

| | | | |
|---|---|---|---|
| 2003/0097378 A1* | 5/2003 | Pham et al. | 707/200 |
| 2003/0110391 A1* | 6/2003 | Wolff et al. | 713/200 |
| 2003/0126449 A1* | 7/2003 | Kelly et al. | 713/187 |
| 2003/0131259 A1* | 7/2003 | Barton et al. | 713/201 |
| 2003/0135791 A1* | 7/2003 | Natvig | 714/38 |
| 2003/0196103 A1* | 10/2003 | Edwards et al. | 713/200 |
| 2004/0088570 A1* | 5/2004 | Roberts et al. | 713/201 |
| 2004/0128355 A1* | 7/2004 | Chao et al. | 709/206 |

FOREIGN PATENT DOCUMENTS

| | | |
|---|---|---|
| EP | 1 291 749 A2 | 3/2003 |
| EP | 1291749 * | 3/2003 |
| GB | 2 378 015 A | 1/2003 |
| GB | 2378015 * | 1/2003 |
| WO | WO 0233525 | 4/2002 |

OTHER PUBLICATIONS

Skoudis, Ed, and Zeltser, Lenny. Malware: Fighting Malicious Code, Prentice Hall. 2003. Chapter 2.*

* cited by examiner

METHOD OF, AND SYSTEM FOR, HEURISTICALLY DETECTING VIRUSES IN EXECUTABLE CODE

This application is the US national phase of international application PCT/GB04/00997, filed 8 Mar. 2004, which designated the US and claims priority to GB Application No. 0309464.6, filed 25 Apr. 2003. The entire contents of these applications are incorporated herein by reference.

BACKGROUND AND SUMMARY

The present invention relates to a method of, and system for, heuristically detecting viruses in executable code by detecting that an executable file is likely to be a previous known executable file, and that the file has been changed. This technique is especially applicable to situations where files enter a system, are checked, then leave, such as email gateways or web proxies. However, it is not intended to be limited to those situations.

The expression "virus" as used in this specification and claims is to be understood in a broad, inclusive sense encompassing any form of malware in executable code.

Increasing use of the Internet, personal computers and local- and wide-area networks has made the problem of computer viruses ever more acute.

Some internet service providers (ISP) offer anti-virus scanning, of attachments to e-mails, and file-downloads and transfers, as a value-added service to their clients. A conventional method of anti-virus scanning is to scan the file looking for patterns or sequences of bytes which have been established as being a characteristic "signature" of a known virus. However, signature-based scanning is not ideal in the rapidly changing internet environment particularly if it is used as the sole virus detection method. When an outbreak of a previously-unknown virus occurs, anti-virus specialists have first to identify a suitable signature to characterize the virus and this then has to be disseminated to anti-virus scanners in the field, all of which takes time. Another disadvantage is that file-scanning can be very resource-intensive, particularly where file traffic volumes are high. The system needs to have enough processing power and file-buffering capacity to keep delays to a minimum and to cope with peak demands.

According to the present invention, there is provided an anti-virus file scanning system for computer files comprising:

a computer database containing records of known executable programs which are deemed to be uninfected and criteria by which a file being processed can be determined to be an instance of one of those programs;

means for processing a file being transferred between computers to determine whether the file matches the criteria characterising a file as an unchanged instance of a program in the database; and means for signalling the file as known or not depending on the determination made by the processing means.

The invention also provides a method of anti-virus scanning system computer files comprising:

maintaining a computer database containing records of known executable programs which are deemed to be uninfected and criteria by which a file being processed can be determined to be an instance of one of those programs;

processing a file being transferred between computers to determine whether the file matches the criteria characterising a file as an unchanged instance of a program in the database; and signalling the file as known or not depending on the determination made by the processing means.

The invention is based upon the fact that a significant proportion of network traffic of executable files is made up of uninfected copies of common applications and utilities such as WinZip and the like. If these can be reliably identified as such, the system need not scan them further, so reducing the processing and storage load on the system.

BRIEF DESCRIPTION OF THE DRAWINGS

The invention will be further described by way of non-limitative example with reference to the accompanying drawings, in which.

DETAILED DESCRIPTION OF EXAMPLE EMBODIMENTS

Figure 1:
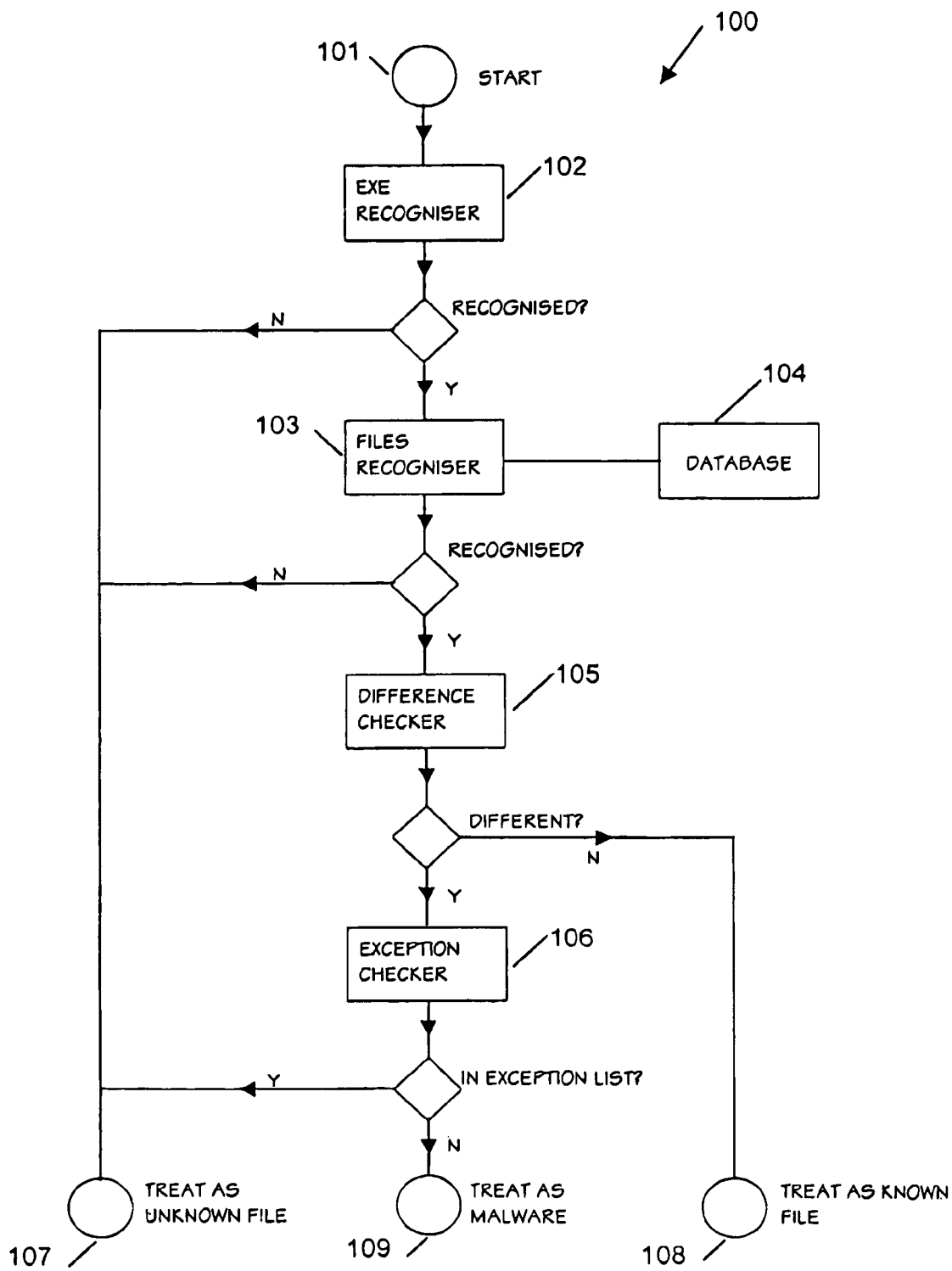
FIG. 1 is a block diagram of the present invention.

FIG. 1 illustrates one form of a system according to the present invention, which might be used, for example by an ISP as part of a larger anti-virus scanning system which employs additional scanning methods on files which are not filtered out as "safe" by the system of FIG. 1.

The source of the files inputted to the system of FIG. 1 is not material to the invention. The files could, for example, be copies of attachments of e-mails being processed by an ISP en route to delivery to its customers, which have been temporarily saved to disk for anti-virus processing before the e-mail is delivered. In the case of processing file downloads or transfers, the system could be associated with a trusted proxy server which retrieves the file from an untrusted remote site, e.g. a website or FTP site, saves it temporarily to disk for scanning and then delivers it to the user via whatever internet protocol he or she is using.

The nature of a file-infecting virus is such that it changes the contents of an executable file by inserting the virus code. On a file system, it is possible to detect this change by creating a checksum or hash string of the file (such as those generated by the well-known MD5 or SHA5 checksum algorithms), and comparing it to the checksum that the file should have. If they are the same, then to an extremely high probability, the file is unchanged. If they are different, then the file has been changed.

However, this check is not possible if it is being carried out at a gateway, such as an email gateway. When the file arrives, the checksum of the file in its good state is not known—only the current checksum can be calculated. Therefore, there is no immediate method of determining that the file has been changed.

One way to get round this is to find a way of recognising the file. Once this is done, the checksum of the file in its good state can be looked up in a database. This known good checksum can then be compared with the actual checksum of the file. If they are different, the file has been changed, and special action may then be taken—this could for instance include quarantining the file, or marking it for further automatic or manual analysis. This is the method implemented by the system 100 of FIG. 1, which operates according to the following algorithm.

1. A file arrives for scanning, perhaps as an email attachment, or a web download at an input 101.

2. The file is passed to an 'EXE recogniser' 102 to check if it is an executable file. If not, it is not analysed further, and is treated as an unknown file.

3. The file is then passed to a 'File recogniser' 103 to check if it is a previously known file by reference to a database 104 of known files. If not, it is not analysed further, and is signalled as an unknown file at an output 107.

4. The file is then passed to a 'Difference checker' 105 to check if it is an unchanged copy of the known file. If so, it is not analysed further, and is signalled as a known file at an output 108.

5. The file is passed to an 'Exception checker' 106 to check for known exceptions. If an exception list match is found, no further action is taken, and the file is signalled as an unknown file at the output 107.

6. The file appears to be a changed copy of a previously known executable file. It is therefore signalled as an example of file infecting malware at an output 109.

The system 101 may form part of a larger malware detection system which submits files initially to the system 101 and then, depending on the results signalled at outputs 107, 108 and 109 may submit the file to other file-scanning sub-systems if the file is signalled by output 107 to be an unknown file, treat the file as known and safe if signalled as such by the output 108 or handle the file as malware if signalled as such at output 109. In the latter case, the file may be subject to any of the usual malware-handling actions (or any appropriate combination of them), e.g. it may be quarantined, the intended recipient may be notified that malware has been detected, it may be submitted for attention by a human operator, it may be deleted, etc.

In the case of a file signalled as "unknown" at output 107, once this has been processed further to determine whether it is in fact malware, if the determination is that it is not, the database 104 may be automatically updated with an entry for it, so that the system 101 can treat subsequent instances of it as a known file.

One way of implementing the EXE recogniser 102 is simply by comparing the first few bytes of the file with the published specifications for the particular format.

For instance, here is a simplistic example of an algorithm for determining if a file is likely to be a Windows PE file.

Read in first 2 bytes. If these are not 'MZ' then stop
Read in another 58 bytes.
Read in 4 bytes into variable x (treating using intel byte-ordering)
Seek to offset x in file
Read in 4 bytes
If bytes are P E \0 \0, then file is likely to be a Windows PE file Recognisers can be created for each additional executable file format as desired.

The file recogniser 1 can use various strategies for determining if the file is a known file. For instance, pattern matching scanning techniques can be used. This is similar to the techniques used by virus scanners to identify known malware—except in this case to identify known good files instead. Another technique is to split the file into areas suggested by analysing the structure of the file, and checksumming each of the areas. These can then be compared with checksums in the database 104 which have been generated by doing the same analysis on known files. Unless the virus modifies every single area, there will be at least one match which will then identify the file.

A simplistic implementation of the difference checker 105 could checksum the entire file, and compare this with the checksum the known file should have.

It is possible that occasional false positives could arise. For instance, although unlikely, two different files could have the same checksum. Another scenario is a packer compressing part of a file, but leaving others uncompressed. The exception checker 106 can be designed to accommodate these situations. For instance, in the case of the packed files, all files packed by the particular packer exhibiting the behaviour can be ignored. It will be apparent from FIG. 1 that this treatment of packers does not constitute a "hole" in the system from the point of view of letting viruses through. The file is only processed by the exception checker if it has already been determined that the file does not correspond to an unchanged version of a known file, and what the exception checker does is to signal whether the file a) should be considered as malware, if it is not in the exception list or b) is unknown and should therefore be subject to further virus-detection processing.

As well as using the system 101 as a stand-alone virus detection algorithm, it can be combined with systems implementing other techniques as part of a larger system. For instance, programs flagged as malware by the system 101 may be allocated a certain score, or variety of scores depending which tests pass and fail. Scores may also be assigned using other heuristic techniques, and only if the total score passes some limit is the program flagged as viral.

The system 101 can also be used as an indicator for program files which may need further analysis. For instance, programs flagged as known files at an output 108 may not need further analysis, since they have already been flagged as 'safe'. Programs flagged at output 107 as unknown files may need further analysis.

The difference checker 105 can also be adapted to cope with files that are expected to change. For instance, a self extracting ZIP file may have a potentially different ZIP bound to it every time. Some programs also carry within themselves registration keys, and these may be different for every user. In such cases it is possible to create a checksum of the parts of the file that are invariant each time, and use that. For instance, the checksum may be created from bytes 0x0000 to 0x0A00, and from 0x0A73 to 0x3000.

If the difference checker 105 is modified in this way, then the files it matches will not necessarily be treated as known files needing no further analysis. For instance, if a self extracting ZIP file is recognised, then the files inside the ZIP archive will need extracting and analysing before the file can be considered safe. Each known file will therefore need an associated status which flags whether further processing is or is not required.

I claim:

1. An anti-malware file scanning system for computer files being transferred between computers, the system being implemented on a computer apparatus and comprising:
   a) a computer database containing records of known executable programs which are deemed to be not malware and criteria by which a file being processed can be determined to be an instance of one of those programs, the criteria including at least one characteristic signature associated with each said instance;
   b) means for processing a file being transferred between computers, the means b) comprising:
      a file recogniser operative to determine whether the file being processed is an instance of a known program by checking the contents of the file being processed for the presence of said at least one characteristic signature associated with the said instances;
      a difference checker operative, in the case that the file recogniser determines the file being processed to be an instance of a known program, to check whether the file is an unchanged version of that known program;
   c) means for signalling the file, depending on the determination made by the processing means, as being:
      likely to be not malware if it is an unchanged version of a known file;

likely to be malware if it is a changed version of a known file; or of unknown status if it is not determined as being an instance of a known file;

wherein the processor assigns a score to a file identified as likely to be malware, and storing the determination that the file is likely to be not malware, is likely to be malware or is of unknown status.

2. A system according to claim 1 and including:

d) means for processing a file being transferred between computers to determine whether it is considered to be, or considered possibly to be, malware, and wherein the means d) is operative to subject a file to processing if the file is signaled by the signalling means c) as being of unknown status.

3. A system according to claim 1 wherein the difference checker is operative to generate a checksum for the entire file under consideration or for at least one selected region thereof, and to compare the checksum or checksums with those of entries in the database.

4. A system according to claim 1 and including an exception list handler operative to determine, in relation to a file which the processing means b) has determined is a changed version of a known file, whether that file has characteristics matching an entry in an exception list of files, the signalling means c) being operative to signal the file as malware only if it is not in the exception list or as being of unknown status otherwise.

5. A method of anti-malware scanning computer files being transferred between computers, the method comprising:

maintaining a computer database containing records of known executable programs which are deemed to be uninfected and criteria by which a file being processed can be determined to be an instance of one of those programs, the criteria including at least one characteristic signature associated with each said instance;

processing a file being transferred between computers by determining whether the file being processed is an instance of a known program by checking the contents of the file being processed for the presence of said at least one characteristic signature associated with the said instances, and checking, in the case that the file is determined to be an instance of a known program, whether the file is an unchanged version of that known program;

signalling the file, depending on the determination made by the processing, as being:

likely to be not malware if it is an unchanged version of a known file;

likely to be malware if it is a changed version of a known file; or of unknown status if it is not determined as being an instance of a known file;

wherein the processor assigns a score to a file identified as likely to be malware, and storing the determination that the file is likely to be not malware, is likely to be malware or is of unknown status.

6. A method according to claim 5 and including:

processing a file being transferred between computers to determine whether it is considered to be, or considered possibly to be, malware, if the file is signalled by the signalling step c) as being of unknown status.

7. A method according to claim 5 wherein the step of checking whether the file being processed is an instance of a known program comprises generating a checksum for the entire file under consideration or for at least one selected region thereof, and comparing the checksum or checksums with those of entries in the database.

8. A method according to claim 5 further including using an exception list to determine, in relation to a file which the processing step b) has determined is a changed version of a known file, whether that file has characteristics matching an entry in an exception list of files, and wherein, in the signalling step c), the file is signalled as malware if it is not in the exception list or as being of unknown status otherwise.

9. An anti-malware file scanning system for computer files being transferred between computers, the system comprising:

a computer database containing records of known executable programs which are deemed to be not malware and criteria by which a file being processed can be determined to be an instance of one of those programs, the criteria including at least one characteristic signature associated with each said instance;

a processor for processing a file being transferred between computers, the processor being operative to determine whether the file being processed is an instance of a known program by checking the contents of the file being processed for the presence of said at least one characteristic signature associated with the said instances and, in the case that the file being processed is determined to be an instance of a known program, to check whether the file is an unchanged version of that known program, said processor, depending on the determination, identifying the file being processed as:

(i) likely to be not malware if it is an unchanged version of a known file;

(ii) likely to be malware if it is a changed version of a known file; or (iii) of unknown status if it is not determined as being an instance of a known file;

wherein the processor assigns a score to a file identified as likely to be malware, and storing the determination that the file is likely to be not malware, is likely to be malware or is of unknown status.

10. An anti-malware file scanning system according to claim 9, further comprising:

a file-scanning subsystem for scanning files identified by the processor as being of unknown status to determine whether the scanned files are malware.

11. An anti-malware file scanning system according to claim 10, wherein records for files which are instances of programs determined by the file-scanning system not to be malware are added to the computer database.

* * * * *